United States Patent
Kawaguchi et al.

(10) Patent No.: US 7,130,402 B2
(45) Date of Patent: Oct. 31, 2006

(54) COMMUNICATION REQUEST PROCESSING SYSTEM COMMUNICATION REQUEST PROCESSING METHOD COMMUNICATION REQUEST PROCESSING APPARATUS

(75) Inventors: Fumiko Kawaguchi, Yokohama (JP); Takashi Tosaki, Tokyo (JP); Takeshi Sugiyama, Yokosuka (JP); Akira Kaiyama, Yokohama (JP); Takanobu Yamamoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 507 days.

(21) Appl. No.: 10/349,185

(22) Filed: Jan. 23, 2003

(65) Prior Publication Data

US 2003/0152206 A1    Aug. 14, 2003

(30) Foreign Application Priority Data

Jan. 31, 2002  (JP)  ............................. 2002-024514
Dec. 17, 2002  (JP)  ............................. 2002-365306

(51) Int. Cl.
*H04M 3/436*  (2006.01)
*H04M 7/00*   (2006.01)
*H04M 15/00*  (2006.01)

(52) U.S. Cl. ............ 379/196; 379/112.06; 379/221.06; 379/221.07

(58) Field of Classification Search ............... 379/111, 379/112.01, 112.02, 112.06, 196, 197, 198, 379/199, 200, 219, 220.01, 221.01, 221.03, 379/221.05, 221.06, 221.07

See application file for complete search history.

(56) References Cited

U.S. PATENT DOCUMENTS

| | | | | |
|---|---|---|---|---|
| 5,408,528 A | * | 4/1995 | Carlson et al. | 379/211.02 |
| 5,467,388 A | | 11/1995 | Redd, Jr. et al. | 379/210.02 |
| 5,768,360 A | * | 6/1998 | Reynolds et al. | 379/211.02 |
| 5,778,057 A | * | 7/1998 | Atai | 379/221.08 |
| 5,862,334 A | | 1/1999 | Schwartz et al. | 709/223 |

FOREIGN PATENT DOCUMENTS

JP    2001-306742    11/2001

* cited by examiner

*Primary Examiner*—Harry S. Hong
(74) *Attorney, Agent, or Firm*—Crowell & Moring LLP

(57) ABSTRACT

To extract part of a large volume of traffic and adjust the total volume of traffic dynamically. When a communication request is originated from a telecommunications apparatus, a communications control unit makes an inquiry to a service control unit. The service control unit screens originators based on originators' attribute information in its possession and service contract information. Then, based on the results of screening, it sends back to the communications control unit instructions to reroute subsequent calls. The communications control unit connects to the information processing unit based on the reply from the service control unit and transfers information. Thus, only the communication requests which satisfy predetermined criteria are connected. The information processing unit compiles statistics on the transferred information based on attribute information in its possession. The statistics are transferred to the information providing unit and to the information processing unit.

14 Claims, 14 Drawing Sheets

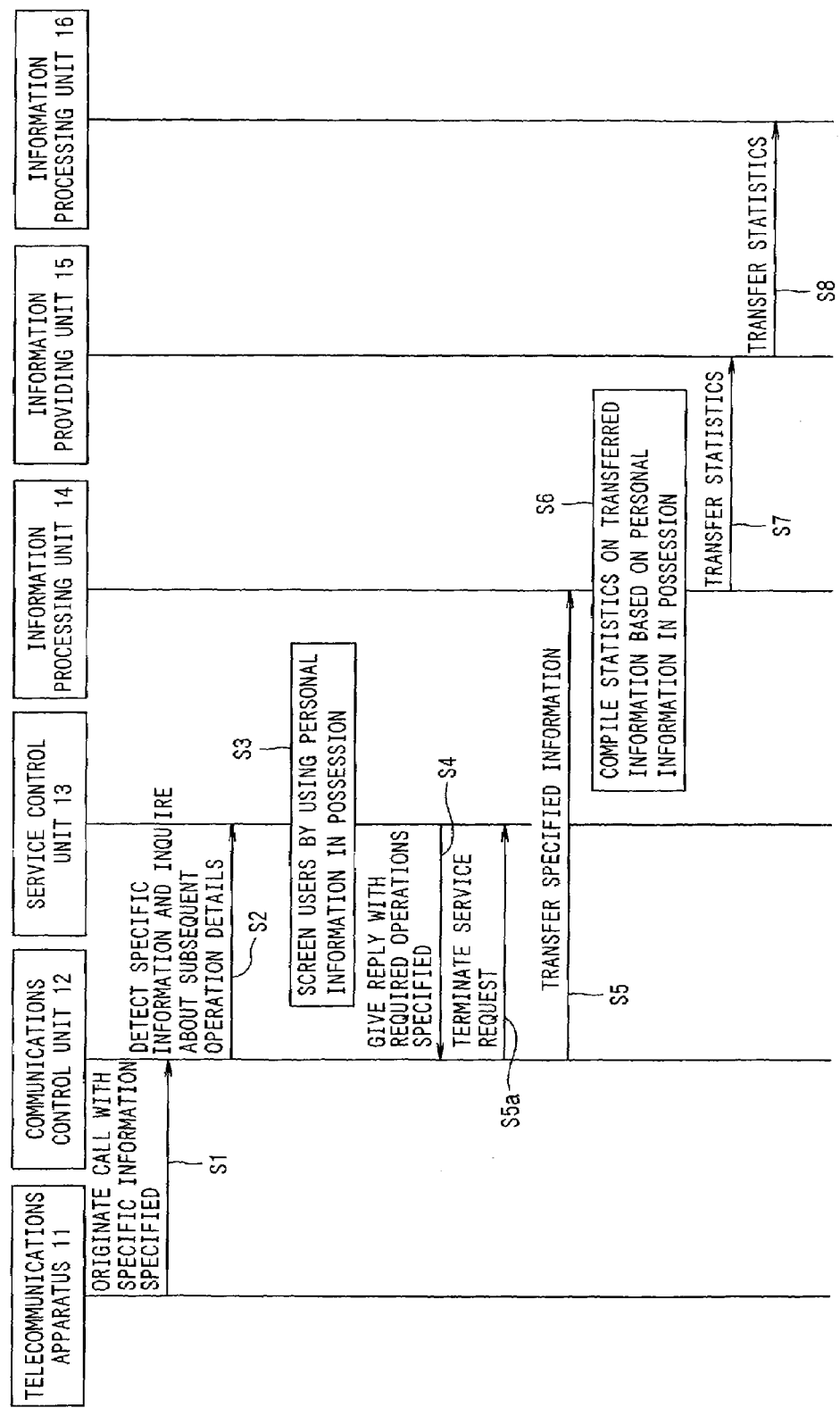

FIG. 9

INFORMATION STRUCTURE 1

- ORIGINATOR NUMBER (IA5)
- SUBSCRIPTION TYPE (BINARY)
- IDENTIFICATION NUMBER OF SERVICE REQUEST TO INQUIRE ABOUT (Int)
- REASON FOR INQUIRY (Int)
- INFORMATION ARRANGED TO BE TRANSMITTED/RECEIVED (SERVICE-DEPENDENT)
- SERVICE IDENTIFIER OF REQUESTED SERVICE (Int)

INFORMATION STRUCTURE 2

- IDENTIFICATION NUMBER OF SERVICE REQUEST TO INQUIRE ABOUT (Int)
- INFORMATION ARRANGED TO BE TRANSMITTED/RECEIVED (SERVICE-DEPENDENT)
- DETERMINATION RESULTS (Int)
- INFORMATION ABOUT CONNECTED PARTY (IA5)
- INFORMATION SENT OUT UPON CONNECTION

INFORMATION STRUCTURE 3

- IDENTIFICATION NUMBER OF SERVICE REQUEST TO INQUIRE ABOUT (Int)
- INFORMATION ARRANGED TO BE TRANSMITTED/RECEIVED (SERVICE-DEPENDENT)
- ORIGINATOR NUMBER (IA5)
- SERVICE IDENTIFIER OF REQUESTED SERVICE (Int)
- RESULTS OF INFORMATION TRANSMISSION UPON CONNECTION (BINARY, SERVICE-DEPENDENT)

INFORMATION STRUCTURE 4

- IDENTIFICATION NUMBER OF SERVICE REQUEST TO INQUIRE ABOUT (Int)
- INFORMATION ARRANGED TO BE TRANSMITTED/RECEIVED (SERVICE-DEPENDENT)
- REASON FOR TERMINATION OF SERVICE REQUEST

INFORMATION STRUCTURE 1

INFORMATION STRUCTURE 3

INFORMATION STRUCTURE 4

COMMUNICATION REQUEST PROCESSING SYSTEM COMMUNICATION REQUEST PROCESSING METHOD COMMUNICATION REQUEST PROCESSING APPARATUS

BACKGROUND OF THE INVENTION

1. Field of the Invention

The present invention relates to a communication request processing system, communication request processing method, and communication request processing apparatus. More particularly, it relates to a communication request processing system, communication request processing method, and communication request processing apparatus for receiving connection requests from a plurality of originators in relation to a plurality of communication requests directed to a specific subscriber.

2. Description of the Related Art

Generally, if a large number of calls directed to a specific subscriber arrive from a plurality of originators, it is not possible to connect all of them. A large number of calls can come into a holding apparatus which holds specific information, for example in relation to purchasing of tickets for sports events such as baseball, football, or the like or concerts.

When calls are made to specific information, conventional communications network services do not use cut-through operations, which involve dynamically rerouting the calls and changing connection conditions in cooperation with so-called service control points in the terminology of intelligent networks. This is also true of IP (Internet Protocol)-based communications networks.

A system is known which allows users to find service providing facilities easily via the Internet (see, e.g., Japanese Patent Application Laid-Open No. 2001-306742 (Abstract)). This system posts information including selected attributes of users in an electronic bulletin board format on communications terminal on the side of the facilities.

When a large number of connections are made with a holding apparatus which holds specific information as described above, a problem of degraded connection quality arises because junctions with a public communications network become congested.

It is considered that in the future, there will be more than one traffic source as viewed from a holding apparatus which uses a specific transport protocol (e.g., IP) for connection. For example, there will be an interconnection between a PSTN (Public Switched Telephone Network) and IP network using VoIP (Voice over Internet Protocol). Consequently, an attempt at simple traffic control at the IP level will complicate interworking when returning appropriate information to the calling party and limits the means of taking service-specific actions with respect to the calling party. IP-based networks prescribe various techniques for guaranteeing QoS (Quality of Service) using the IP layer itself or an ATM (Asynchronous Transfer Mode) layer. In that case, however, the information holding apparatus must perform moment-by-moment control taking a total traffic amount into consideration.

The present invention has been made to overcome the above-mentioned drawbacks of the prior art. Its object is to provides a communication request processing system, communication request processing method, and communication request processing apparatus which can make effective use of the public networks or the like by extracting part of a large volume of traffic and making the total volume of traffic dynamically adjustable.

SUMMARY OF THE INVENTION

The communication request processing system set forth in claim 1 of the present invention is a communication request processing system which receives connection requests from a plurality of originators in relation to a plurality of communication requests directed to a specific subscriber, characterized in that it comprises determining means for determining whether each of said plurality of communication requests satisfies predetermined criteria, and only those communication requests on which affirmative determination of satisfaction of the predetermined criteria is made by the determination means to satisfy said criteria are connected to said specific subscriber. This makes it possible to adjust traffic dynamically and utilize public networks and the like effectively. Incidentally, "communication requests" maybe made using voice calls or packet data such as Web access.

The communication request processing system set forth in claim 2 of the present invention is the communication request processing system according to claim 1, wherein the determination means determines whether the criteria are satisfied, based on attribute information about the originators who have originated the communication requests and attribute information preregistered for the specific subscriber. By making determination based on preregistered attribute information, it is possible to provide fine-tuned network operations.

The communication request processing system set forth in claim 3 of the present invention is the communication request processing system according to claim 1 or 2, wherein the determination means makes determination only when traffic volume resulting from the plurality of communication requests is within a range predetermined as simultaneously available maximum connection capacity. This eliminates the need for determination when the traffic volume is outside the predetermined range.

The communication request processing system set forth in claim 4 of the present invention is the communication request processing system according to any of claims 1 to 3, further comprising statistical means for compiling statistics on the attribute information about the originators based on the attribute information about the originators who have originated the communication requests and attribute information preregistered for the specific subscriber. By compiling statistics based on preregistered attribute information for a specific subscriber such as registration directly from the subscriber or registration through an agent such as a communication service provider, it is possible to collect useful information.

The communication request processing system set forth in claim 5 of the present invention is the communication request processing system according to claim 4, wherein the attribute information about the originators who have originated the communication requests is stored in storage means provided separately for each of the determination means and the statistical means. This makes it possible to duplicate data, providing the advantage that operation can be continued even if one of the storage means fails.

The communication request processing system set forth in claim 6 of the present invention is the communication request processing system according to claim 4, wherein the attribute information about the originators who have originated the communication requests is stored in common storage means provided for the determination means and the statistical means. This provides the advantage of needing only to make a registration with a single subscriber management information & attribute manager when data is registered or changed, eliminating the need to do anything special to ensure consistency of data content.

The communication request processing system set forth in claim 7 of the present invention is the communication request processing system according to claim 6, wherein the storage means, the determination means, and the statistical means are implemented in the same apparatus. This provides the advantages of needing only one housing and making maintenance easier.

The communication request processing method set forth in claim 8 of the present invention is a communication request processing method for receiving connection requests from a plurality of originators in relation to a plurality of communication requests directed to a specific subscriber: comprising a determination step of determining whether each of the plurality of communication requests satisfies predetermined criteria; and a connection step of connecting only those communication requests on which affirmative determination of satisfaction of the criteria is made in the determination step, to the specific subscriber. This makes it possible to adjust traffic dynamically and utilize public networks and the like effectively.

The communication request processing method set forth in claim 9 of the present invention is the communication request processing method according to claim 8, wherein the determination step determines whether the criteria are satisfied, based on attribute information about the originators who have originated the communication requests and attribute information preregistered for the specific subscriber. By making determination based on preregistered attribute information, it is possible to provide fine-tuned network operations.

The communication request processing method set forth in claim 10 of the present invention is the communication request processing method according to claim 8 or 9, wherein the determination step makes determination only when traffic volume resulting from the plurality of communication requests is within a range predetermined as simultaneously available maximum connection capacity. This eliminates the need for determination when the traffic volume is outside the predetermined range.

The communication request processing method set forth in claim 11 of the present invention is the communication request processing method according to any of claims 8 to 10, further comprising a statistical step of compiling statistics on the attribute information about the originators based on the attribute information about the originators who have originated the communication requests and attribute information preregistered for the specific subscriber. By compiling statistics on preregistered attribute information, it is possible to collect useful information.

The communication request processing apparatus set forth in claim 12 of the present invention is a communication request processing apparatus which receives connection request from a plurality of originators in relation to a plurality of communication requests directed to a specific subscriber, comprising: first and second storage means for storing the attribute information about the originators who have originated the communication requests and attribute information preregistered for the specific subscriber, respectively; and determination means for determining whether each of the plurality of communication requests satisfies predetermined criteria based on content of the first and second storage means, wherein only the communication requests on which affirmative determination of satisfaction of the criteria is made by the determination means are connected to the specific subscriber. This makes it possible to adjust traffic dynamically and utilize public networks and the like effectively.

The communication request processing apparatus set forth in claim 13 of the present invention is the communication request processing apparatus according to claim 12, wherein the determination means makes determination only when traffic volume resulting from the plurality of communication requests is within a range predetermined as simultaneously available maximum connection capacity. This eliminates the need for determination when the traffic volume is outside the predetermined range.

The communication request processing apparatus set forth in claim 14 of the present invention is the communication request processing apparatus according to claim 12 or 13, further comprising statistical means for compiling statistics on the attribute information about the originators based on the attribute information about the originators who have originated the communication requests and attribute information preregistered for the specific subscriber. By compiling statistics on preregistered attribute information, it is possible to collect useful information.

In short, by handling calls within the communications network to which each originator belongs instead of connecting to a public network which presents problems when making a large number of connections to specific information, it is possible to reduce the number of flatly refused connections and alleviate congestion as well as to reroute calls dynamically for the originators. This makes it possible to gather information as well as to provide fine-tuned network operations to those who requests information or statistics. Also, it becomes possible to vary information to be provided to calling parties, from service to service, whereas they can produce only uniform reactions because it is normally difficult to handle vast traffic.

BRIEF DESCRIPTION OF THE DRAWINGS

FIG. 8 is a sequence diagram showing a first operation example of the communication request processing system shown in FIG. 1;

FIG. 9 is a diagram showing structure examples of information exchanged among units shown in FIG. 1;

DETAILED DESCRIPTION OF THE PREFERRED EMBODIMENTS

Figure 1:
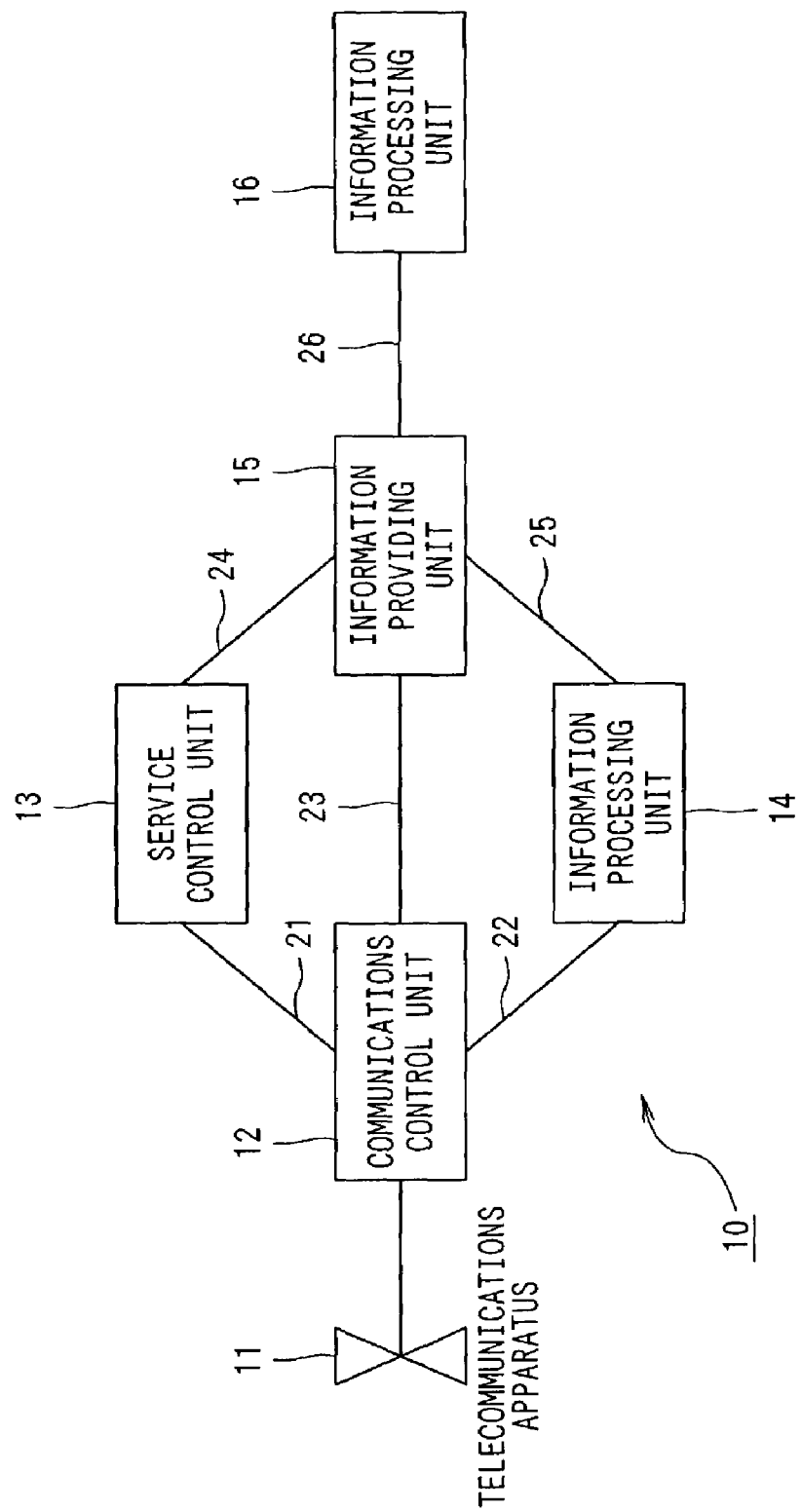
FIG. 1 is a block diagram showing an embodiment of a communication request processing system according to the present invention.

Next, an embodiment of the present invention will be described with reference to the drawings. Incidentally, equivalent components are denoted by the same reference numerals in the drawings referred to in the following description.

FIG. 1 is a block diagram showing an embodiment of a communication request processing system according to the present invention. As shown in the figure, the communication request processing system according to this embodiment comprises a communications control unit 12 which performs communications control, service control unit 13 which holds service contract information and controls services, information processing unit 14 which compiles statistics on collected information, and information providing unit 15 which provides information to the information processing unit 14 and originators, in a communications network 10. The telecommunications apparatus 11 is a terminal used directly by the user. It may be, for example, a mobile communications terminal or fixed telephone terminal. Incidentally, this system controls not only voice calls, but also packets sent out by a PDA (Personal Digital Assistant) or personal computer.

The communications control unit 12 in FIG. 1 may be, for example, a switchboard. The communications control unit 12 is connected to the service control unit 13 via a signal line 21, to the information processing unit 14 via a signal line 22, and to the information providing unit 15 via a signal line 23; the service control unit 13 is connected to the information providing unit 15 via a signal line 24; the information processing unit 14 is connected to the information providing unit 15 via a signal line 25; and the information providing unit 15 is connected to an information processing unit 16 via a signal line 26.

The communications control unit 12, service control unit 13, information processing unit 14, and, information providing unit 15 are components of a public network.

The information providing unit 15 receives statistics (described later) and sends them out to the information processing unit 16.

The information processing unit 16 is, for example, a server of a provider which provides predetermined services. As shown in FIG. 1, the information processing unit 16 may be installed outside the public network. Alternatively, the information providing unit 15 may be a server of a provider which provides services. In that case, the communications control unit 12, service control unit 13, and information processing unit 14 are components of the public network.

The problem described earlier can be solved when the units connected in this way perform service control in conjunction with one another.

The network which adopts this system may be a network, such as a mobile communications network, which carries out circuit switching or a packet communications network.

Now, exemplary internal configuration of various units composing this system will be described below.

(Communications Control Unit)

Figure 2:
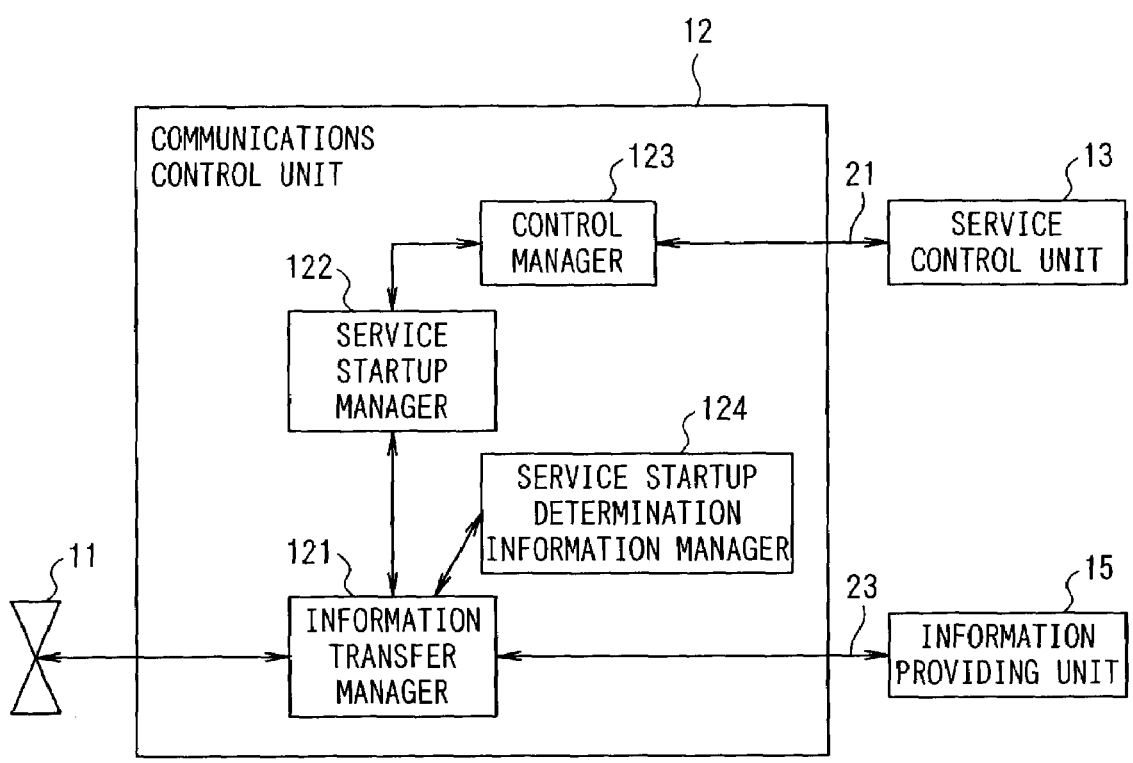
FIG. 2 is a block diagram showing a configuration example of the communications control unit shown in FIG. 1.

As shown in FIG. 2, the communications control unit 12 comprises an information transfer manager 121, service startup manager 122, control manager 123, and service startup determination information manager 124. The communications control unit 12 is generally provided by a common carrier. For example, the communications control unit 12 may be a switchboard.

There are a plurality of telecommunications apparatus 11. Thus, a plurality of communication requests are entered in the service control unit 13 and information processing unit 14. Generally, there are also a plurality of communications control units 12, which are used in turns by known round robin and other algorithms.

The information transfer manager 121 receives communication requests sent out from the telecommunications apparatus 11 and connects the telecommunications apparatus 11 to the information processing unit 16 via another unit, the information providing unit 15. This makes it possible to provide services implemented by the information processing unit 16 to the telecommunications apparatus 11.

However, it is not that services are provided unconditionally in response to any communication request from any telecommunications apparatus 11. Services are provided by specific service providers only when certain criteria are satisfied. For that, the service startup determination information manager 124 stores telephone numbers and URLs of specific service providers. When a communication request is addressed to a telephone number or URL stored by the service startup determination information manager 124, an inquiry is made to the service control unit 13. The inquiry to the service control unit 13 is made by the information transfer manager 121 via the service startup manager 122 and control manager 123.

Upon receiving an instruction from the information transfer manager 121, the service startup manager 122 instructs the control manager 123 to make an inquiry to the service control unit 13.

Upon receiving the instruction from the service startup manager 122, the control manager 123 inquires of the service control unit 13 whether the communication request from the telecommunications apparatus 11 satisfies predetermined criteria. In response to the inquiry, the service control unit 13 transmits information to the information transfer manager 121 via the control manager 123 and the service startup manager 122. According to the content of the information, the information transfer manager 121 connects the telecommunications apparatus 11 to the information processing unit 16 via the information providing unit 15. In this way, services implemented by the information processing unit 16 is provided only to the telecommunications apparatus 11 which satisfies the predetermined criteria.

Figure 3:
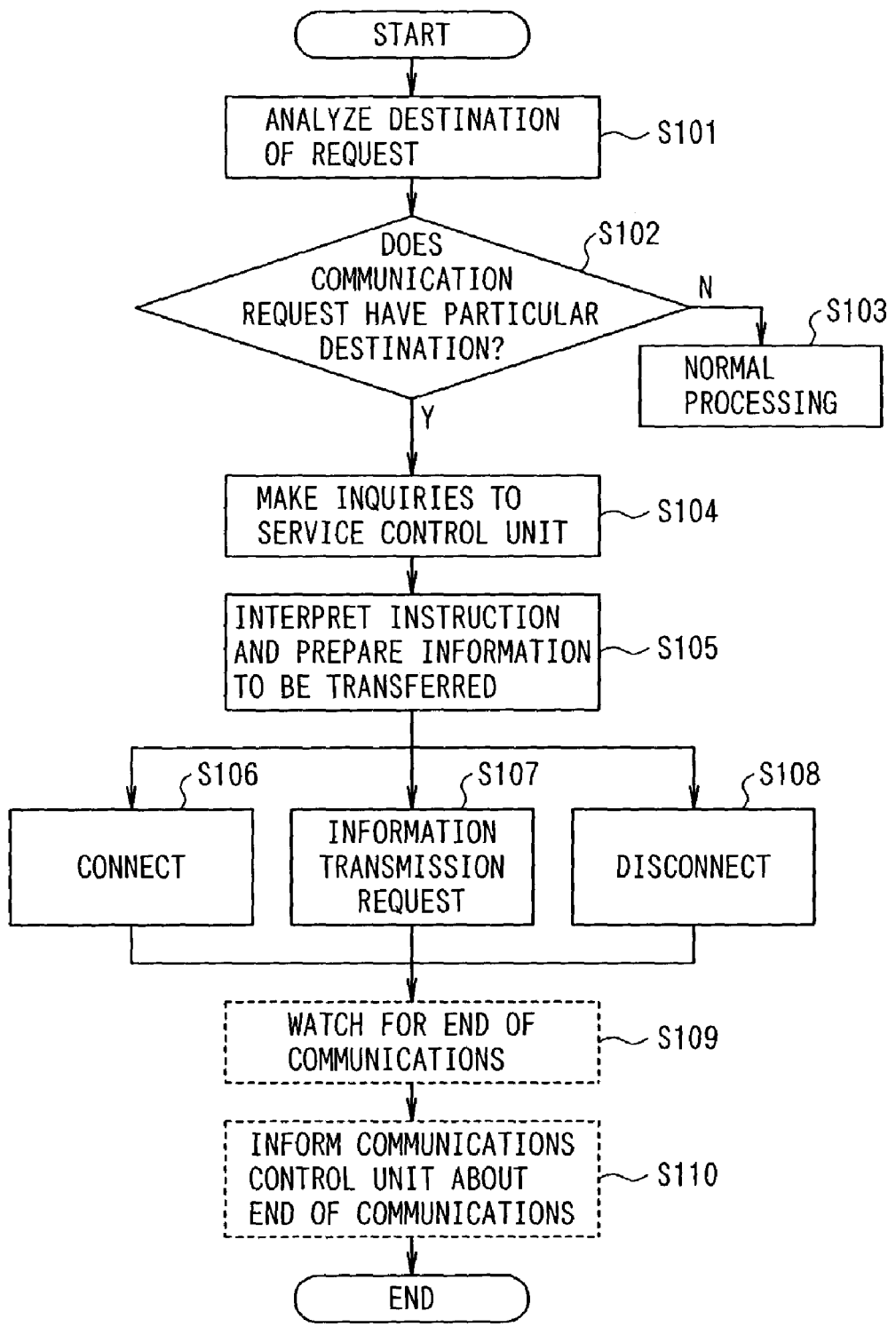
FIG. 3 is a flowchart showing an operation example of the communications control unit shown in FIG. 1.

Operation of the communications control unit 12 with the above configuration will be described with reference to FIG. 3. In the figure, when a communication request is transferred from the telecommunications apparatus 11, the information transfer manager 121 (see FIG. 2) in the communications control unit 12 analyzes the destination (Step S101). If the results of the analysis show that the communication request has no particular destination, the communications control unit 12 goes to normal processing (Step S102→S103).

On the other hand, if the results of the analysis show that the communication request has a particular destination, the service startup manager 122 and the control manager 123 (see FIG. 2) make inquiries to the service control unit 13 (Step S102→S104).

The communications control unit 12 interprets an instruction sent from the service control unit 13 in response to the inquiries and prepares information to be transferred (Step S105). If the instruction specifies connection, the communications control unit 12 carries out an appropriate process (Step S105→S106). If the instruction specifies to make an information transmission request, the communications control unit 12 does so (Step S105→S107). If the instruction specifies disconnection, the communications control unit 12 carries out an appropriate process (Step S105→S108). The information transmission request described above includes information transfer for the purpose of compiling statistics on process details based on attribute information.

End of communications is watched for (Step S109) and the communications control unit 12 may be informed about end of communications (Step S110).

(Service Control Unit)

Figure 4:
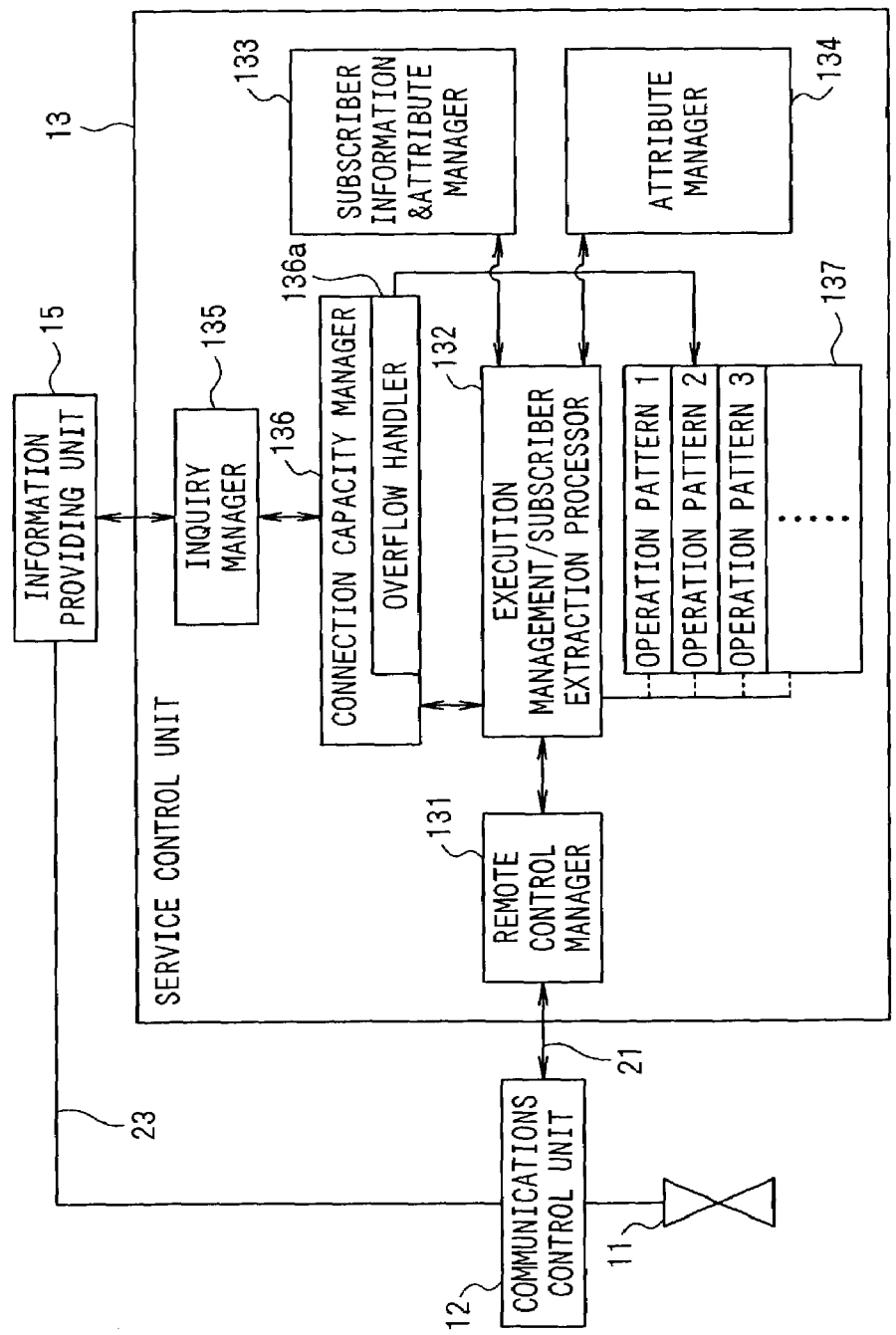
FIG. 4 is a block diagram showing a configuration example of the service control unit shown in FIG. 1.

As shown in FIG. 4, the service control unit 13 comprises a remote control manager 131, execution management/subscriber extraction processor 132, inquiry manager 135, connection capacity manager 136, subscriber information & attribute manager 133, attribute manager 134, and operation pattern storage 137.

The remote control manager 131 in the service control unit 13 has capabilities to receive data from the communications control unit 12 and transmit it to the execution management/subscriber extraction processor 132. The data transmitted from the communications control unit 12 contains attribute information about the calling party and called party and is sent from the remote control manager 131 to the execution management/subscriber extraction processor 132.

The maximum number of circuits or sessions allowed to be connected simultaneously (i.e., maximum connection capacity) has been registered with the connection capacity manager 136. In other words, the maximum number of available voice circuits for voice calls and the maximum number of available sessions for packets have been registered. If connection requests in excess of the maximum connection capacity are made simultaneously, i.e., if an overflow occurs, the situation is handled by an overflow handler 136*a*. The overflow handler 136*a* carries out predetermined overflow handling operation. The overflow handler 136*a* carries out an overflow handling operation by selecting one of operation patterns stored in the operation pattern storage 137 described later. Operation patterns for overflow handling include sending a voice or video message, displaying a specific page, and so forth.

The registration with the connection capacity manager 136 is made by the information providing unit 15 via the inquiry manager 135. If connection requests which do not exceed the registered maximum number are transferred, i.e., if there is no overflow, the overflow handler 136*a* does nothing.

Subscriber attributes are registered with the subscriber information & attribute manager 133 in a conclusion of subscription contract timing or the like. For example, gender information which indicates the sex of subscribers and age information which indicates the age of subscribers have been registered as attributes. The present age of a subscriber can be calculated by adding the elapsed time between the date of contract and the present to the age of the subscriber at the time of contract.

Attribute information has been registered with the attribute manager 134 by service providers to be connected. The registered information can be changed freely by the respective service providers.

When there is a communication request, the execution management/subscriber extraction processor 132 extracts attribute information, including the gender information which indicates the sex of the subscriber, age information which indicates the age of the subscriber, and current location information which indicates the current location of the subscriber, from the subscriber information & attribute manager 133 in response to instructions from the remote control manager 131 and based on data transmitted from the communications control unit 12. Besides, the execution management/subscriber extraction processor 132 determines whether the attribute information extracted from the subscriber information & attribute manager 133 matches the attribute information registered with the attribute manager 134, i.e., whether criteria are satisfied.

When making this determination, each item of the attribute information registered with the attribute manager 134 may be weighted before comparing the attribute information extracted from the subscriber information & attribute manager 133 and the attribute information registered with the attribute manager 134. This comparison may be made using known linear programming. The results of the determination made by the execution manager & subscriber extractor 132 is sent to the operation pattern storage 137, which then determines an operation pattern.

The operation pattern storage 137 stores operation patterns to be executed based on the results produced by the execution management/subscriber extraction processor 132. One of the plurality of operation patterns is selected based on the results produced by the execution management/subscriber extraction processor 132. In other words, multiple programs are prestored for execution and one of them is selected and executed.

Figure 5:
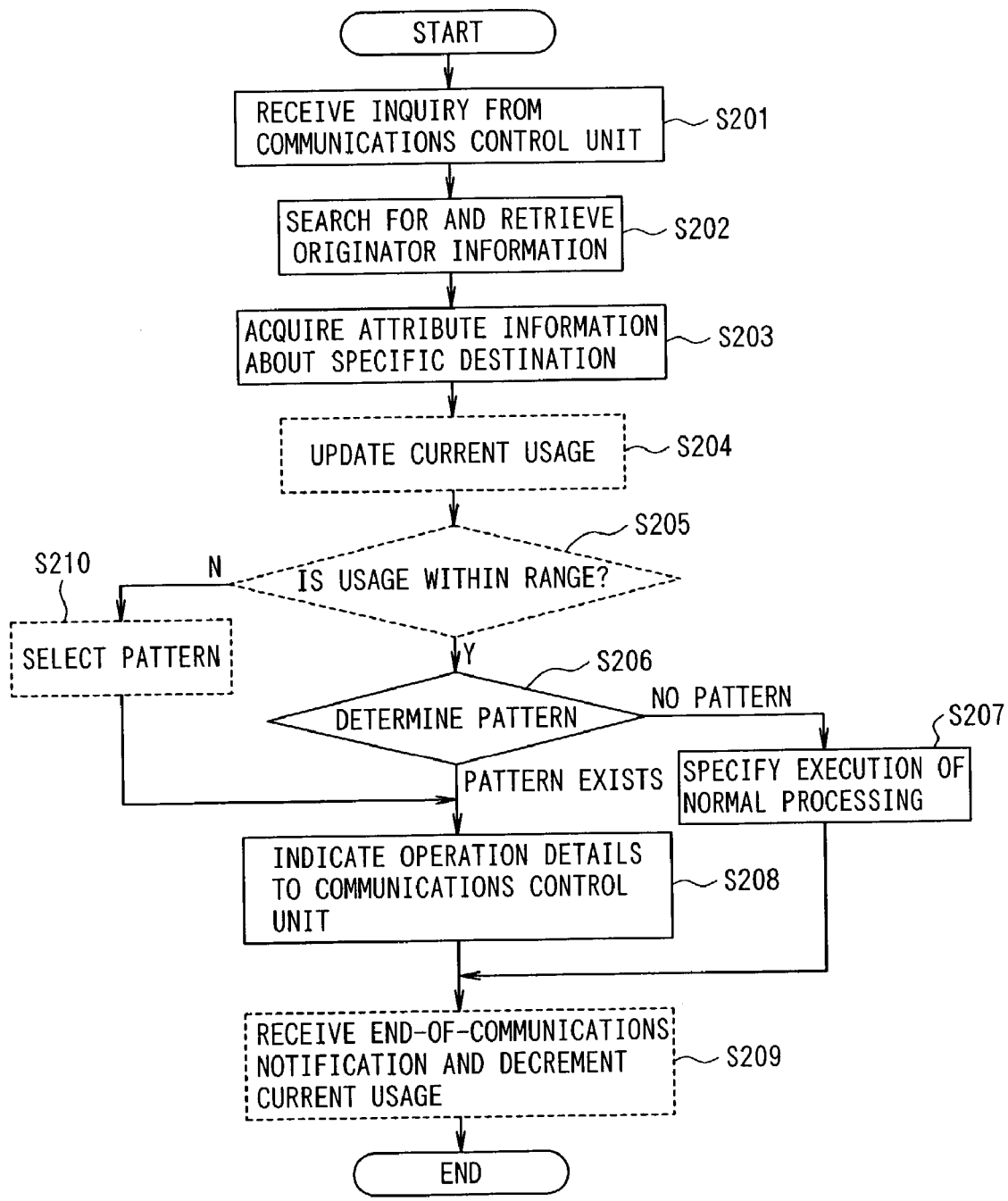
FIG. 5 is a flowchart showing an operation example of the service control unit shown in FIG. 1.

Operation of the service control unit 13 with the above configuration will be described with reference to FIG. 5. In the service control unit 13 in FIG. 5, first, the remote control manager 131 (see FIG. 4) receives an inquiry from the communications control unit 12 (Step S201). Next, the execution management/subscriber extraction processor 132 (see FIG. 4) searches for and retrieves originator information (Step S202). Then, the execution management/subscriber extraction processor 132 (see FIG. 4) acquires attribute information about a specific destination from the attribute manager 134 (Step S203).

If a request to update the current line usage is input, the connection capacity manager 136 updates it (Step S204). In so doing, it is determined whether or not the current line usage is within a predetermined connection capacity (Step S205) If it is outside the connection capacity, the overflow handler 136*a* selects an operation pattern in the operation pattern storage 137 (Step S205→S210).

If the current line usage is within the connection capacity, an operation pattern in the operation pattern storage 137 is selected based on the subscriber information of the originator and attribute information of the specific destination (Step S205→S206).

Once an operation pattern is determined, operation details are indicated to the communications control unit 12 (Step S206→S208). Later, when an end-of-communications notification is received from the communications control unit 12 the current line usage is decremented (Step S209).

If no appropriate operation pattern is available in Step S207, execution of normal processing is specified (Step S206→S207). Later, when an end-of-communications notification is received from the communications control unit 12 the current line usage is decremented (Step S209).

If the current line usage is outside the connection capacity, the need to select one of operation patterns in the operation pattern storage 137 (Step S206) is obviated.

Incidentally, there may be cases in which the processes in Steps S204, S205, S209, and S210 are omitted.

(Information Processing Unit)

Figure 6:
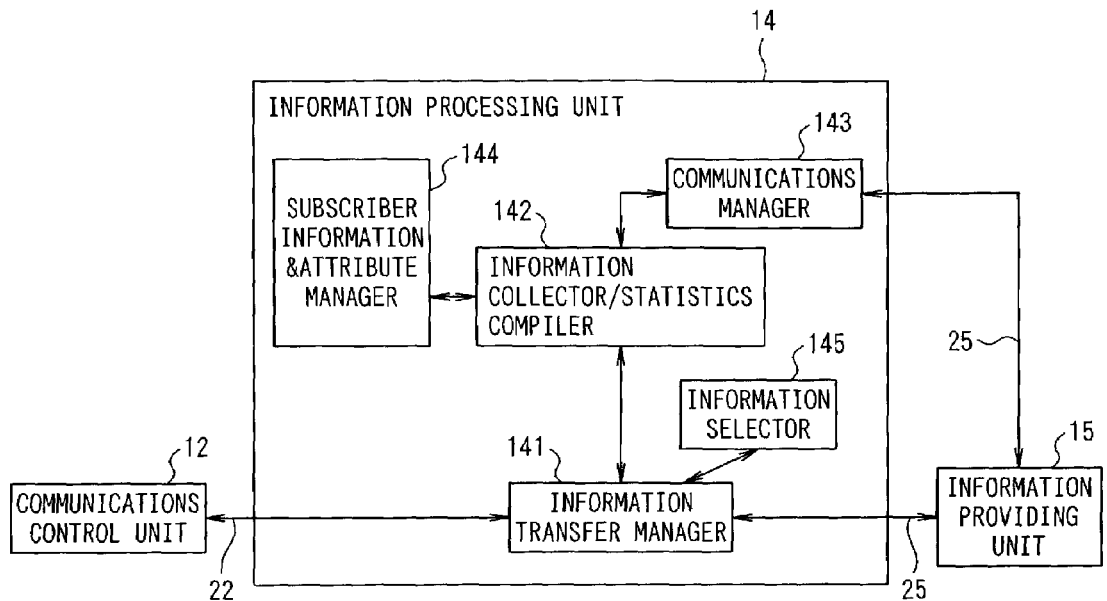
FIG. 6 is a block diagram showing a configuration example of the information processing unit shown in FIG. 1.

As shown in FIG. 6, the information processing unit 14 comprises an information transfer manager 141, subscriber information & attribute manager 144, information collector/statistics compiler 142, communications manager 143, and information selector 145.

The information transfer manager 141 has a capability to receive an information transmission request from the communications control unit 12.

Subscriber attributes are registered with the subscriber information & attribute manager 144 when a subscription contract is concluded, as with the subscriber information & attribute manager 133 of the service control unit 13. For example, gender information which indicates the sex of subscribers and age information which indicates the age of subscribers are registered as attributes. The present age of a subscriber can be calculated by adding the elapsed time between the date of contract and the present to the age of the subscriber at the time of contract.

The information collector/statistics compiler 142 has capabilities to collect information registered with the subscriber information & attribute manager 144, do counting, and compile statistics on the collected information with reference to attribute information contained in a communications request.

The communications manager 143 manages communications between the information processing unit 14 and information providing unit 15.

The information selector 145 has a capability to determine information to be sent out to the information providing unit 15.

Figure 7:
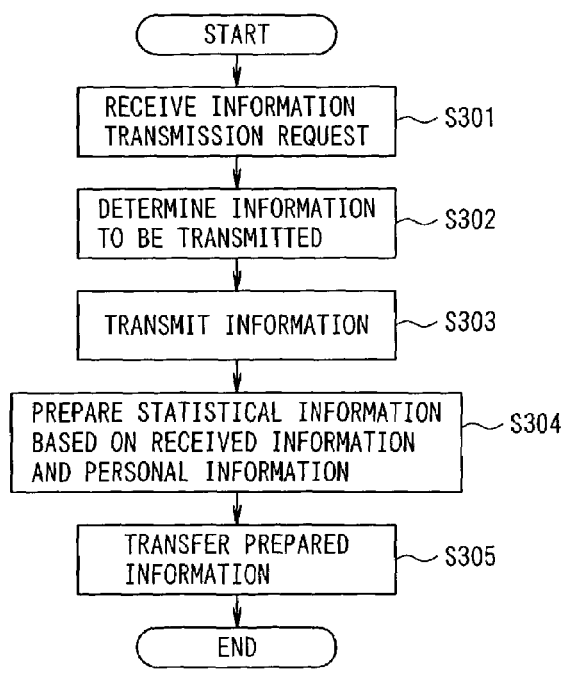
FIG. 7 is a flowchart showing an operation example of the information processing unit shown in FIG. 1.

Operation of the information processing unit 14 with the above configuration will be described with reference to FIG. 7. In the information processing unit 14 shown in FIG. 7, information transfer manager 141 (see FIG. 6) receives an information transmission request from the communications control unit 12 (Step S301). The information transmission request described above includes information transfer for the purpose of compiling statistics on process details based on attribute information.

Next, the information selector 145 (see FIG. 6) in the information processing unit 14 determines information to be sent out to the information providing unit 15 (Step S302). The information transfer manager 141 sends out the determined information to the information providing unit 15 (Step S303).

After the information is sent out to the information providing unit 15, the information collector/statistics compiler 142 (see FIG. 6) in the information processing unit 14 prepares statistical information based on the information transmission request received from the communications control unit 12 and attribute information in the subscriber information & attribute manager 144 (see FIG. 6) (Step S304). The prepared statistical information is transferred to the information providing unit 15 by the communications manager 143 (see FIG. 6) (Step S305).

FIRST OPERATION EXAMPLE

FIG. 8 shows a first operation example of the communication request processing system.

In FIG. 8, when a call is originated from a telecommunications apparatus 11 owned by the user of the system with specific information specified (Step S1), the communications control unit 12 makes an inquiry to the service control unit 13 (Step S2). The inquiry contains such information as the one indicated as "information structure 1" in FIG. 9. "Information structure 1" in FIG. 9 consists of "originator number" (IA5), "subscription type" (Binary), "identification number of service request to inquire about" (Int), "reason of inquiry" (Int), "information arranged to be transmitted/received" (service-dependent) by contract or the like, and "service identifier of requested service" (Int) predefined. Incidentally, "IA5" stands for "International Alphabet 5." "Int" is short for "Integer" and means that the data type is Integer.

Returning to FIG. 8, the service control unit 13 screens originators based on originators' attribute information held in the subscriber information & attribute manager 133 in the originator's apparatus and service contract information (Step S3). Then, based on the results of screening, it sends back to the communications control unit 12 instructions to reroute subsequent calls (Step S4). The reply contains such information as the one indicated as "information structure 2" in FIG. 9. "Information structure 2" in FIG. 9 consists of "identification number of service request to inquire about" "(Int)," "information arranged to be transmitted/received" (service-dependent) by contract or the like, "determination result" (Int), "information about connected party" (IA5), and "information sent out upon connection."

Returning to FIG. 8, the communications control unit 12 connects to the information processing unit 14 based on the reply from the service control unit 13 and transfers information (Step S5). The transferred information contains such information as the one indicated as "information structure 3" in FIG. 9. "Information structure 3" in FIG. 9 consists of "identification number of service request to inquire about" (Int), "information arranged to be transmitted/received" (service-dependent) by contract or the like, "originator number" (IA5), "service identifier of requested service" (Int) predefined, and "results of information transmission upon connection" (Binary, service dependent).

Returning to FIG. 8, before information is transferred in Step S5 (described above), the communications control unit 12 may instruct the service control unit 13 to terminate the service request (Step S5a). This instruction contains such information as the one indicated as "Information structure 4" in FIG. 9. "Information structure 4" shown in FIG. 9 consists of "identification number of service request to inquire about" (Int), "information arranged to be transmitted/received" (service-dependent) by contract or the like, and "reason for termination of service request."

Returning to FIG. 8, the information processing unit 14 compiles statistics on the transferred information based on attribute information in its possession (Step S6). The statistics are transferred to the information providing unit 15 (Step S7) and to the information processing unit 16 (Step S8).

Now, the above processes will be described more specifically. In mobile communications, suppose only the communication requests that come from women and that have an originator number whose last one digit is 0 (zero) are set to be connected to a predetermined line. When originators originate calls with a specific number specified (Step S1), the communications control unit 12 detects specific information and inquires of the service control unit 13 about operation details (Step S2). Upon receiving the inquiries from the communications control unit 12, the service control unit 13 screens the calls according to whether the last one digit of the originator numbers is zero and whether the calls are from a woman by using subscriber information (i.e., attribute information) in its possession (Step S3). Then, the service control unit 13 includes the results of screening in the reply to the communications control unit 12 (Step S4)

The communication requests which have been screened out are connected to the information processing unit 14 (Step S5) and they are disconnected after a guidance message is sent out and the number of communication requests is counted. Then, after a predetermined period of time or after a predetermined number of communication requests, the information processing unit 14 compiles statistics based on the attribute information (Step S6). The statistics (e.g., sex, age, originating areas, etc.) are transferred to the information providing unit 15 (Step S7), which then transfers it to the information processing unit 16 (Step S8).

This system can be used in the manner described above. According to this example, when communication requests are concentrated on a specific subscriber number, for example, in sports event or concert ticket sales, the calls can be controlled in such a way as to allow connections from the originators who satisfy predetermined criteria and refuse connections from the originators who do not satisfy the criteria. A predetermined voice message may be delivered to the subscribers who are refused connection. For example, line congestion may be alleviated by using a voice message: "The line is congested now. Please call again after awhile."

It is also possible to only allocate connections by specifying connections (to screen originators) without counting communication requests.

Besides, the statistics described above may be transferred and provided to other companies. Also, the statistics may be provided not only online, but also offline. Since the statistics are prepared by screening information based on preregistered attribute information on each originator, their use will offer hope of commercial success.

SECOND OPERATION EXAMPLE

Figure 10:
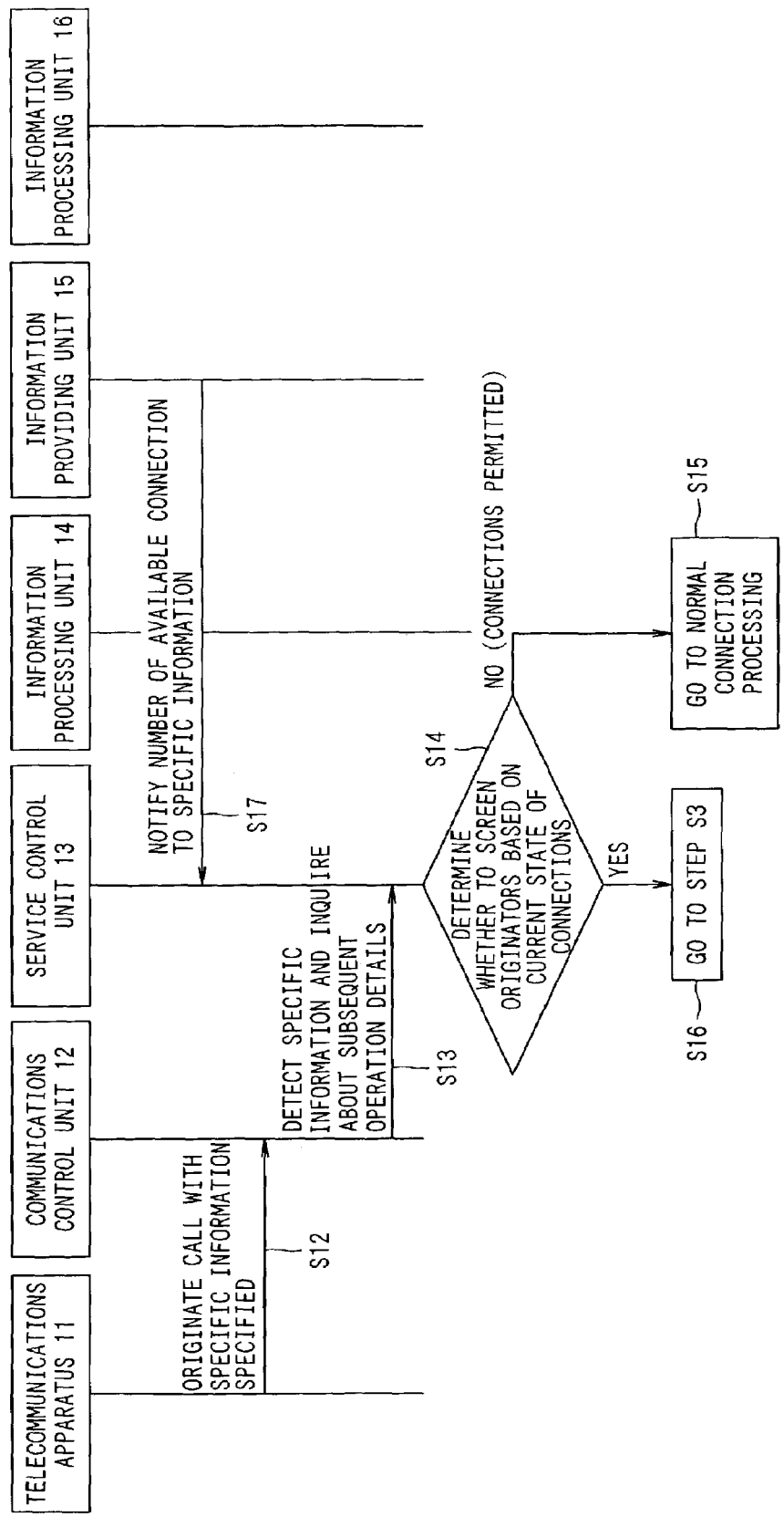
FIG. 10 is a sequence diagram showing a second operation example of the communication request processing system shown in FIG. 1.

FIG. 10 shows a second operation example of the communication request processing system.

In FIG. 10, first, the information providing unit 15 informs the service control unit 13 in advance about the number of allowed connections to specific information (Step S11).

On the other hand, when a call is originated from the telecommunications apparatus 11 owned by the user of the system with specific information specified (Step S12), the communications control unit 12 makes an inquiry to the service control unit 13 (Step S13). The inquiry contains such information as the one indicated as "information structure 1" in FIG. 9. Content of "Information structure 1" is as described above.

Next, the service control unit 13 determines whether to screen originators based on the number of allowed connections to specific information it manages and the current state of connections (Step S14). If no screening is carried out, the service control unit 13 goes to normal connection processing (Step S15). On the other hand, if screening is carried out, the service control unit 13 goes to Step S3 in FIG. 8 (Step S16). The subsequent processes are similar to those described above. In short, according to this example, originators are screened only when the number of connection requests exceeds the predetermined number of allowed connections.

According to this example, in the sales of sports event or concert tickets, for example, when a predetermined number of tickets have been sold out, originators are screened according to predetermined criteria and only the originators who satisfy the criteria are allowed to connect. The subscribers who do not satisfy the criteria are refused connection and a predetermined voice message may be delivered to them.

As described above, when attempts are made to originate calls to desired specific information using more than one type of transport, this system allows only the originators who satisfy criteria which have been prepared based on information specified by users, attribute information on originators, service contract information, etc. to connect to an apparatus which holds the specific information. The communication requests from the originators who do not satisfy the criteria are processed within the communications network or allowed to be connected to another destination. This makes it possible to extract part of a large volume of traffic, and thereby makes the total volume of traffic dynamically adjustable. Control performed in this way ensures effective use of both public networks and holding apparatus of specific information.

(Exemplary Data Format)

Now, with reference to FIGS. 11 to 14, description will be given of a data format used to transmit and receive "Information structure 1" to "Information structure 4" shown in FIG. 9 according to common channel Signalling System 7 (hereinafter abbreviated to SS7). Incidentally, SS7 is a global standard recommended by ITU-T in 1980. It is a communications protocol group used to control public switched phone networks. SS7 controls circuits by using signal lines for phone calls and signal lines for control provided separately and is capable of transmitting and receiving control signals even during a phone call. SS7 includes a protocol (MTP) for controlling channel information and protocol group (SCCP, etc.) for connection processing. Besides, SS7 is designed to allow space for additional features which are not related directly to phone calls. This space reserved for additional features can be used to implement notification of the originator number, automatic transfer or other features.

SS7 is now available over IP transfer networks according to IETF (Internet Engineering Task Force) standard. XML (eXtensible Markup Language) may also be used as another method for representing the data format.

Figure 11:
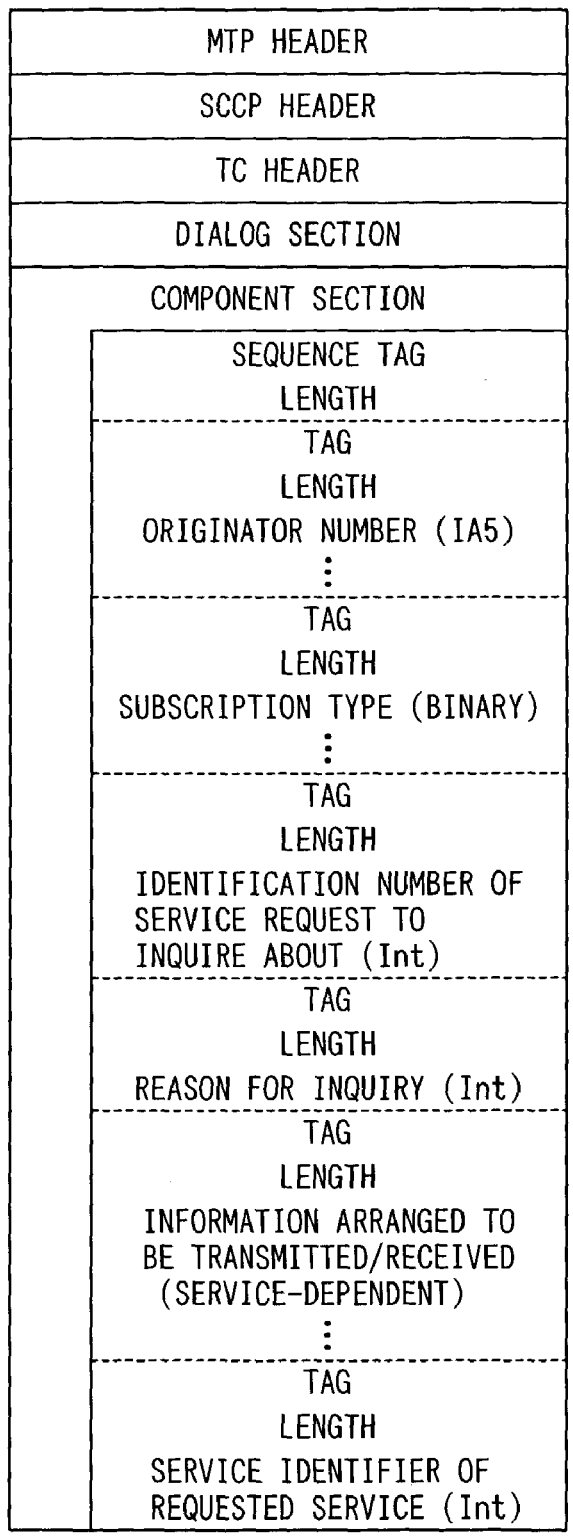
FIG. 11 is a diagram showing an exemplary data format which corresponds to information structure 1 shown in FIG. 9.

The information (Information structure 1) contained in the inquiry sent from the communications control unit 12 to the service control unit 13 has a data format such as the one shown in FIG. 11 if SS7 is used. Referring to FIG. 11, this information consists of an MTP header, SCCP header, TC (Transmission Control) header, dialog section, and component section. The component section contains "sequence tag" and "length," followed in sequence by "originator number" (IA5), "subscription type" (Binary), "identification number of service request to inquire about" (Int), "reason for inquiry" (Int), "information arranged to be transmitted/received" (service-dependent), and "service identifier of requested service" (Int), with "tag" and "length" attached to each of them.

Figure 12:
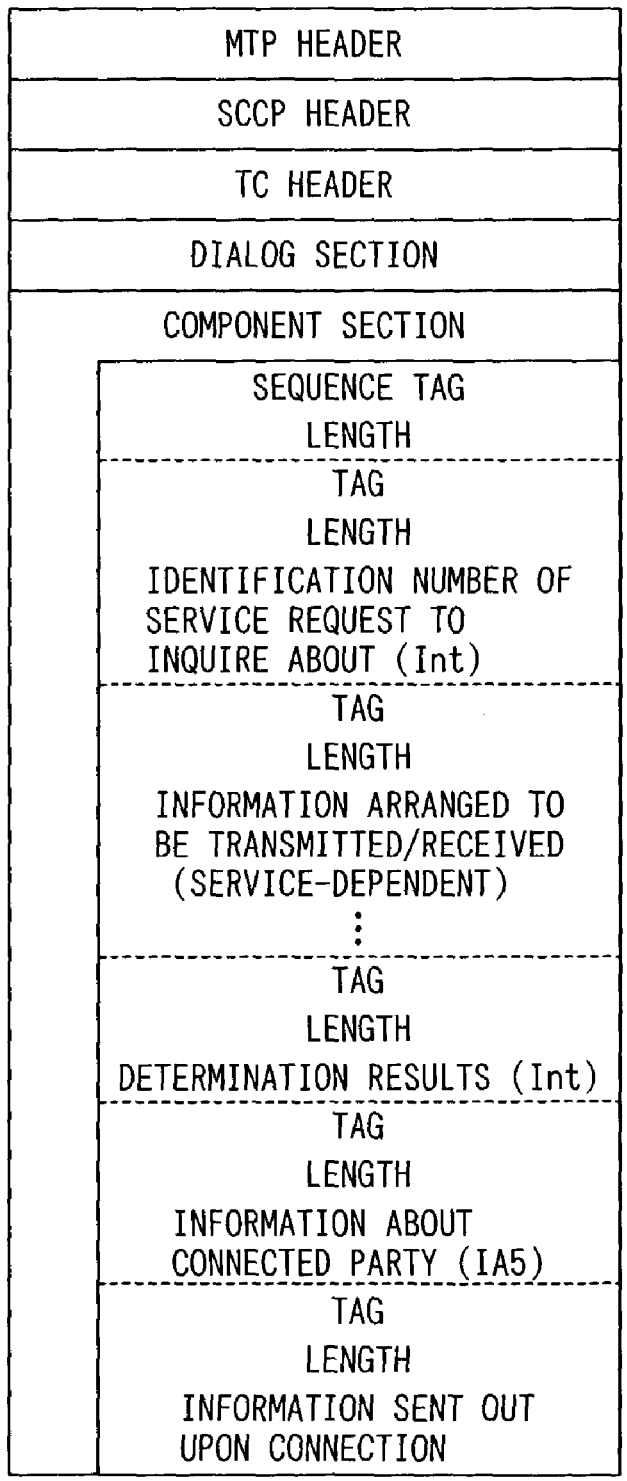
FIG. 12 is a diagram showing an exemplary data format which corresponds to information structure 2 shown in FIG. 9.

The information (Information structure 2) contained in the reply sent from the service control unit 13 to the communications control unit 12 has a data format such as the one shown in FIG. 12 if SS7 is used. Referring to FIG. 12, this information consists of an MTP header, SCCP header, TC header, dialog section, and component section. The component section contains "sequence tag" and "length," followed in sequence by "identification number of service request to inquire about" (Int), "information arranged to be transmitted/received" (service-dependent), "determination results" (Int), "information about connected party"(IA5) and "information sent out upon connection," with "tag" and "length" attached to each of them.

Figure 13:
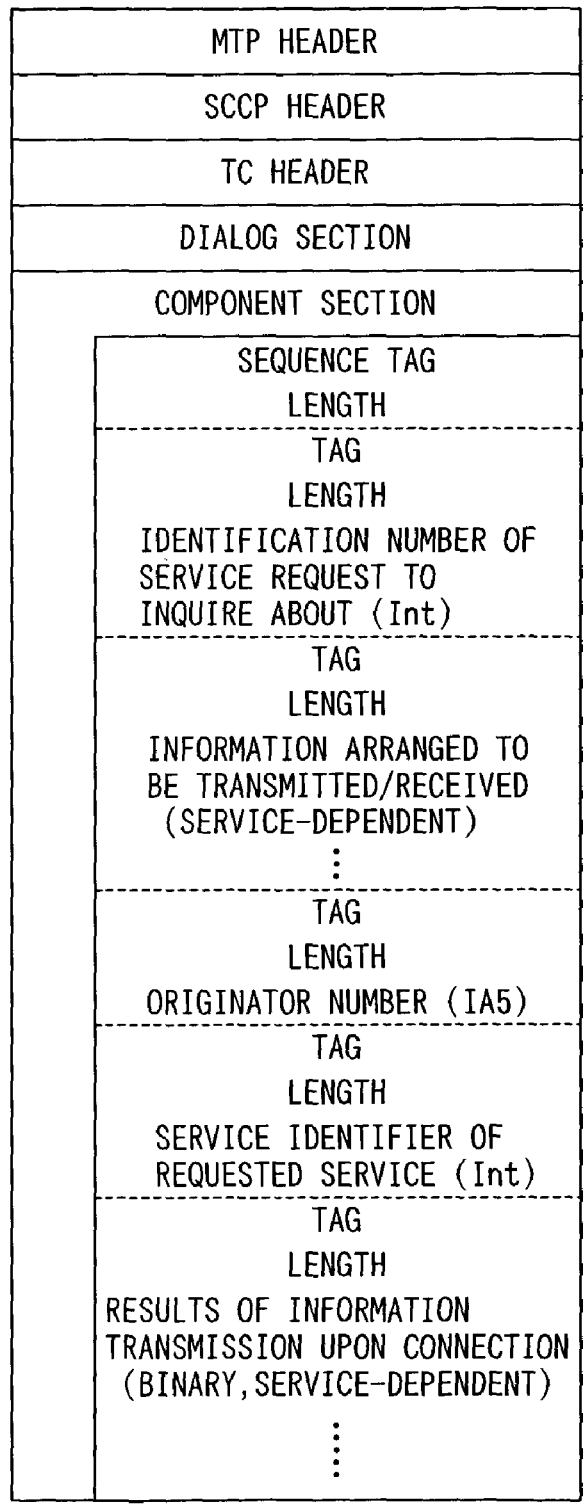
FIG. 13 is a diagram showing an exemplary data format which corresponds to information structure 3 shown in FIG. 9.

The information (Information structure 3) transmitted from the communications control unit 12 to the information processing unit 14 has a data format such as the one shown in FIG. 13 if SS7 is used. Referring to FIG. 13, this information consists of an MTP header, SCCP header, TC header, dialog section, and component section. The component section contains "sequence tag" and "length," followed in sequence by "identification number of service request to inquire about" (Int), "information arranged to be transmitted/received" (service-dependent), "originator number" (IA5), "service identifier of requested service" (Int), "results of information transmission upon connection" (Binary, service-dependent), with "tag" and "length" attached to each of them.

Figure 14:
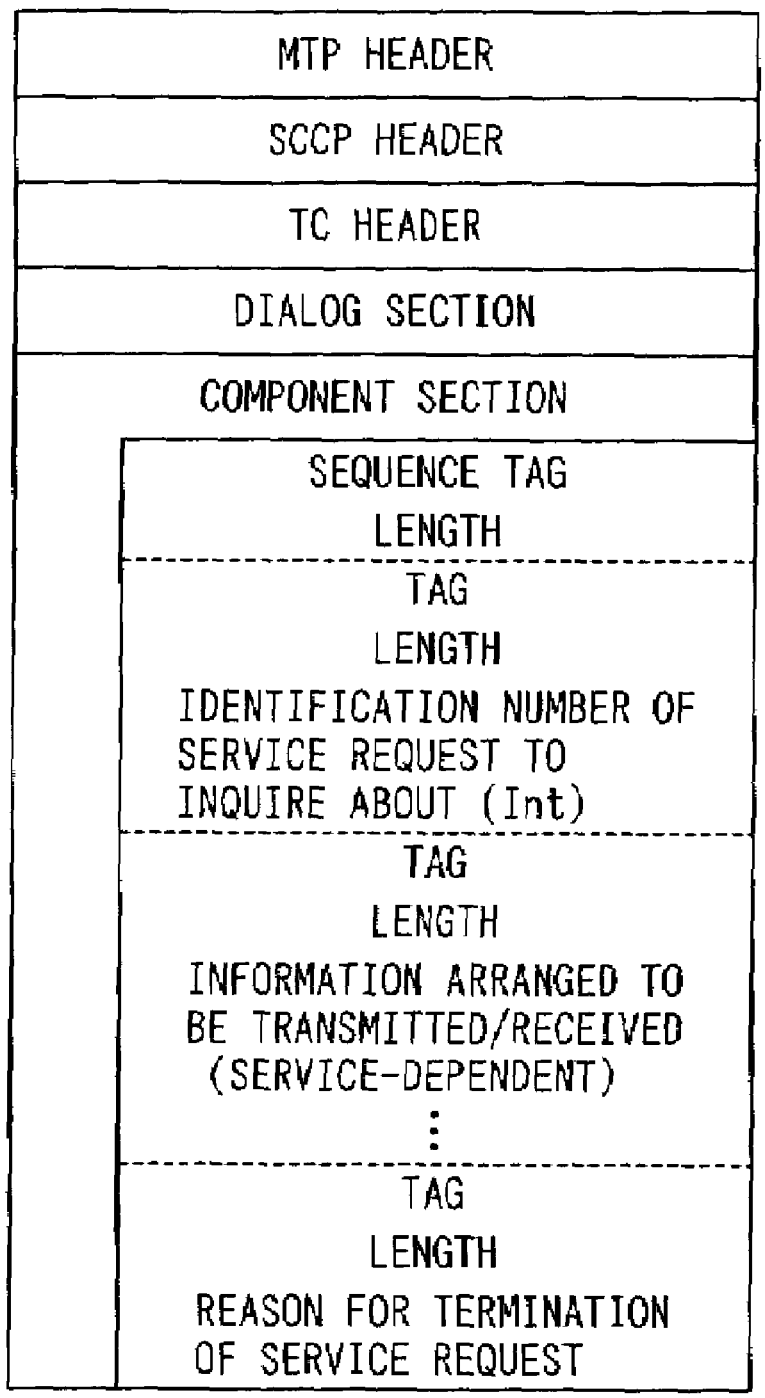
FIG. 14 is a diagram showing an exemplary data format which corresponds to information structure 4 shown in FIG. 9.

The information (Information structure 4) contained in the termination instruction sent from the communications control unit 12 to the service control unit 13 has a data format such as the one shown in FIG. 14 if SS7 is used. Referring to FIG. 14, this information consists of an MTP header, SCCP header, TC header, dialog section, and component section. The component section contains "sequence tag" and "length," followed in sequence by "identification number of service request to inquire about" (Int), "information arranged to be transmitted/received" (service-dependent), and "reason for termination of service request," with "tag" and "length" attached to each of them.

Incidentally, it is desirable to perform the control described above at a location as close to the originating party as possible, i.e., within equipment as close to the telecommunications apparatus as possible. For example, the control described above can be performed on a switchboard on the side of the originating party. This involves smaller traffic loads than when performing the control at a location distant from the telecommunications apparatus. If traffic loads do not create a problem, the control may be performed elsewhere in the network. Then, the control maybe performed anywhere in the network without regard to the position. For example, if the telecommunications apparatus is a portable telephone, the control described above may be performed at a base station.

(Variation)

A subscriber management information/attribute manager which stores attribute information about originators, i.e., subscribers, maybe either shared between the service control unit 13 and information processing unit 14 or provided for each of the units separately.

Providing a separate subscriber management information/attribute manager for each unit may result in complicated processes because of the need to maintain consistency of data content. On the other hand, this makes it possible to duplicate data, providing the advantage that operation can be continued even if one of the storage means fails.

Providing a subscriber management information/attribute manager common to the units will eliminate the need to do anything special to ensure consistency of data content. In particular, this provides the advantage of needing only to make a registration with a single subscriber management information/attribute manager when data is registered or changed. Furthermore, integrating and implementing the service control unit 13 and information processing unit 14 in the same apparatus will provide the advantages of needing only one housing and making maintenance easier.

(Communication Request Processing Method)

A communication request processing method such as the one described below has been implemented in the communication request processing system described above. Specifically, the present invention implements a communication request processing method for receiving connection requests from a plurality of originators in relation to a plurality of communication requests directed to a specific subscriber, comprising a determination step of determining whether each of the plurality of communication requests satisfies predetermined criteria, and a connecting step of connecting only those communication requests on which affirmative determination of satisfaction of the criteria in the determination step, to the specific subscriber. The determination step determines whether the criteria are satisfied, based on the attribute information about the originators who have originated the communication requests and attribute information preregistered for the specific subscriber. It is also possible to make determinations only when traffic volume resulting from the plurality of communication requests is within a range predetermined as simultaneously available maximum connection capacity. Also, the communication request processing method may further comprise a statistical step of compiling statistics on the attribute information about the originators based on the attribute information about the originators who have originated the communication requests and attribute information preregistered for the specific subscriber.

Figure 15:
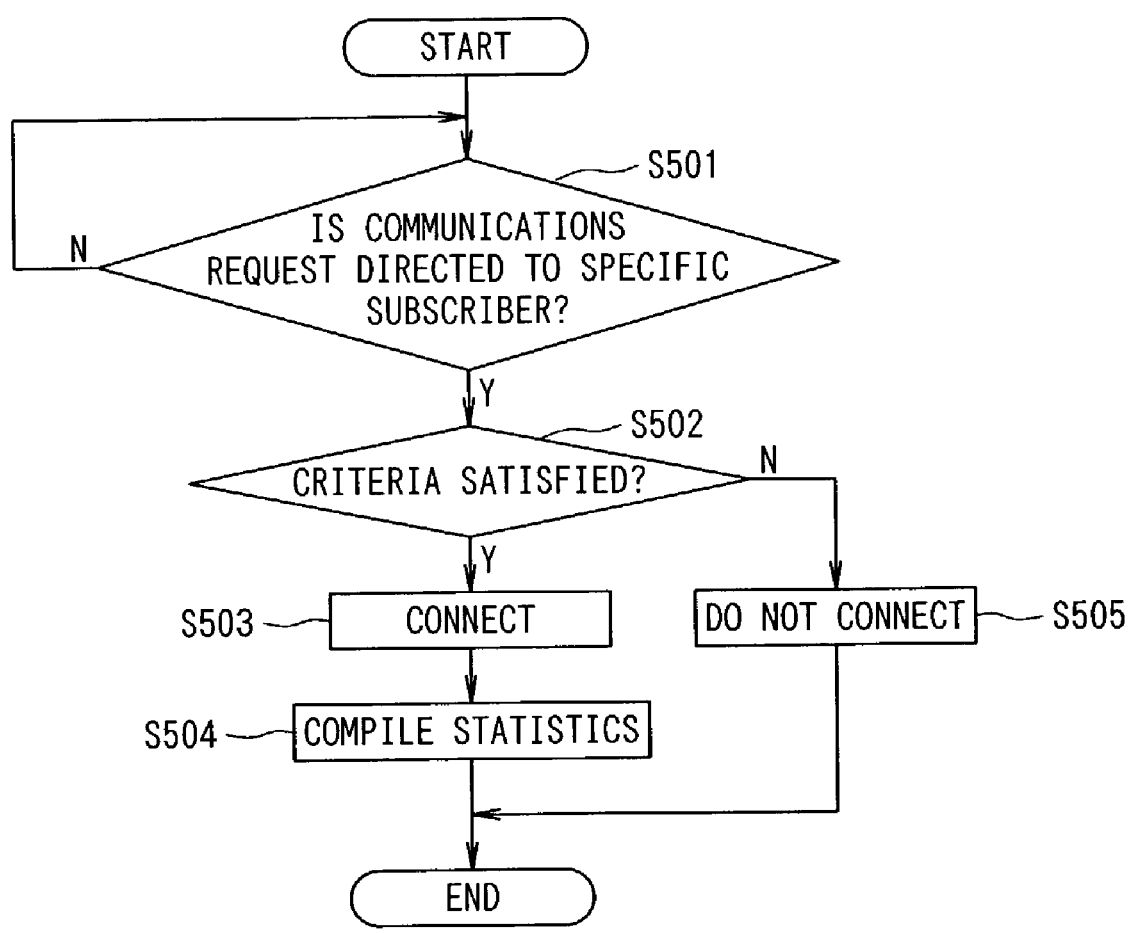
FIG. 15 is a flowchart showing operation of a communication request processing method according to the present invention.

The communication request processing method mentioned above will be described with reference to FIG. 15. As shown in the figure, first, it is determined whether a communication request is directed to the specific subscriber (Step S501). If the communication request is directed to a specific subscriber, it is determined whether the request is within maximum connection capacity or predetermined criteria are satisfied (Step S502). If the predetermined criteria are satisfied, the communication request is connected to the specific subscriber and the service from the specific subscriber is provided to the originator (Step S502→S503). Then, statistics are compiled as described above, and if necessary, they are transferred or output otherwise (Step S504). On the other hand, if the predetermined criteria are not satisfied, the communication request is not connected to the specific subscriber (Step S502→S505).

When attempts are made to originate calls to desired specific information using more than one type of transport, the communication request processing method described above allows only the originators who satisfy criteria which have been prepared based on information specified by users, attribute information on originators, service contract information, etc. to connect to an apparatus which holds the specific information. The communication requests from the originators who do not satisfy the criteria are processed within the communications network or allowed to be connected to another destination. This makes it possible to extract part of a large volume of traffic, and thereby makes the total volume of traffic dynamically adjustable. Control performed in this way ensures effective use of both public networks and holding apparatus of specific information.

A communication request processing scheme is used in mobile communications and the like to dynamically reroute calls based on information held by the service control unit through cooperation between a service control unit and a communications control unit as well as to provide statistics to an external information processing unit which requests statistics through cooperation between an information processing unit which compiles statistics based on information specified by originators and information providing unit. It relates to service contents, in particular, the communication request processing scheme according to this invention is very useful in reducing congestion, etc. when implemented between a communications network and facilities which have an external information processing unit.

As described above, the present invention has the advantage that by connecting only the communication requests which satisfy predetermined criteria, the service control unit can reroute calls dynamically when a large number of calls are originated. Thus, the present invention is effective in reducing congestion, and so forth when implemented between a communications network and facilities which have an external information processing unit.

What is claimed is:

1. A communication request processing system which receives connection requests from a plurality of originators in relation to a plurality of communication requests directed to a specific subscriber, wherein:
    said system comprises determination means for determining whether each of said plurality of communication requests satisfies predetermined criteria;
    said determination means determines whether said criteria are satisfied, based on attribute information about originators who have originated said communication requests and attribute information preregistered for said specific subscriber;
    said determination means makes said determination only when traffic volume resulting from said plurality of communication requests is within a range predetermined as a simultaneously available maximum connection capacity;
    only those communication requests for which an affirmative determination of satisfaction of said criteria is made by the determination means are connected to said specific subscriber; and
    said system further comprises an overflow handler for performing an overflow handling operation by selecting an operation pattern from among operation patterns stored in an operation pattern storage, when said traffic volume exceeds said range.

2. The communication request processing system according to claim 1, further comprising statistical means for compiling statistics on the attribute information about the originators based on the attribute information about the originators who have originated said communication requests and attribute information preregistered for said specific subscriber.

3. The communication request processing system according to claim 2, wherein the attribute information about the originators who have originated said communication requests is stored in storage means provided separately for each of said determination means and said statistical means.

4. The communication request processing system according to claim 2, wherein the attribute information about the originators who have originated said communication requests is stored in common storage means provided for said determination means and said statistical means.

5. The communication request processing system according to claim 4, wherein said storage means, said determination means, and said statistical means are implemented in the same apparatus.

6. A communication request processing method for receiving connection requests from a plurality of originators in relation to a plurality of communication requests directed to a specific subscriber, wherein:
    the processing method includes a determination step in which a determination is made whether each of said plurality of communication requests satisfies predetermined criteria;
    said determination step makes said determination whether said criteria are satisfied, based on attribute information about the originators who have originated said communication requests and attribute information preregistered for said specific subscriber;
    said determination step makes said determination only when traffic volume resulting from said plurality of communication requests is within a range predetermined as simultaneously available maximum connection capacity;
    only those communication requests for which an affirmative determination of satisfaction of the predetermined criteria is made in the determination step are connected to said specific subscriber; and
    said method further comprises an overflow handling step of performing an overflow handling operation by selecting an operation pattern from among operation patterns stored in an operation pattern storage, when said traffic volume exceeds said range.

7. The communication request processing method according to claim 6, further comprising a statistical step of compiling statistics on the attribute information about the originators based on the attribute information about the originators who have originated said communication requests and attribute information preregistered for said specific subscriber.

8. A communication request processing apparatus which receives a connection request from a plurality of originators in relation to a plurality of communication requests directed to a specific subscriber, comprising:
    first and second storage means for storing the attribute information about originators who have originated said communication requests and attribute information preregistered for said specific subscriber, respectively; and
    determination means for determining whether each of said plurality of communication requests satisfies predetermined criteria based on content of said first and second storage means; wherein,
    only the communication requests on which affirmative determination of satisfaction of said criteria is made by the determination means are connected to said specific subscriber; and
    said apparatus further comprises an overflow handler for performing an overflow handling operation by selecting an operation pattern from among operation patterns stored in an operation pattern storage, when traffic volume resulting from said communication requests exceeds a range that has been predetermined as a simultaneously available maximum connection capacity.

9. The communication request processing apparatus according to claim 8, wherein said determination means makes determination only when said traffic volume is within said range.

10. The communication request processing apparatus according to claim 8, further comprising statistical means for compiling statistics on the attribute information about the originators based on the attribute information about the originators who have originated said communication requests and attribute information preregistered for said specific subscriber.

11. The communication request processing system according to claim 1, further comprising statistical means for compiling statistics on the attribute information about the originators based on the attribute information about the originators who have originated said communication requests and attribute information preregistered for said specific subscriber.

12. The communication request processing system according to claim 11, wherein the attribute information about the originators who have originated said communication requests is stored in storage means provided separately for each of said determination means and said statistical means.

13. The communication request processing system according to claim 11, wherein the attribute information about the originators who have originated said communication requests is stored in common storage means provided for said determination means and said statistical means.

14. The communication request processing system according to claim 13, wherein said storage means, said determination means, and said statistical means are implemented in the same apparatus.

* * * * *